(12) United States Patent
Wakabayashi

(10) Patent No.: US 6,233,299 B1
(45) Date of Patent: *May 15, 2001

(54) ASSEMBLY FOR TRANSMUTATION OF A LONG-LIVED RADIOACTIVE MATERIAL

(75) Inventor: Toshio Wakabayashi, Mito (JP)

(73) Assignee: Japan Nuclear Cycle Development Institute, Ibaraki-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/165,296

(22) Filed: Oct. 2, 1998

(51) Int. Cl.$^7$ .................................................. G21G 1/00

(52) U.S. Cl. ..................... 376/202; 376/170; 376/414; 376/423; 376/427; 376/455; 376/158

(58) Field of Search .................................... 376/414, 416, 376/417, 420–425, 428, 435, 202, 170–173, 423, 427, 455, 158

(56) References Cited

U.S. PATENT DOCUMENTS

| | | | |
|---|---|---|---|
| 2,947,080 | * 8/1960 | Kates et al. | 376/416 |
| 2,990,352 | * 6/1961 | Finniston et al. | 376/416 |
| 2,994,656 | * 8/1961 | Zumwalt | 376/417 |
| 3,085,059 | * 4/1963 | Burnham, Jr. | 376/416 |
| 3,111,475 | * 11/1963 | Davidson | 376/423 |
| 3,145,150 | * 8/1964 | Gylfe | 376/423 |
| 3,166,614 | * 1/1965 | Taylor | 376/423 |
| 3,170,847 | * 2/1965 | Dudek et al. | 376/421 |
| 3,212,988 | * 10/1965 | Ringot | 376/416 |

(List continued on next page.)

FOREIGN PATENT DOCUMENTS

| | | | |
|---|---|---|---|
| 220257 | * 8/1961 | (AT) | 376/417 |
| 286658 | * 3/1953 | (CH) | 376/423 |
| 2155518 | * 5/1973 | (DE) | 376/424 |
| 1407720 | * 6/1965 | (FR) | 376/414 |
| 2 647 945 | 12/1990 | (FR) . | |
| 2 702 591 | 9/1994 | (FR) . | |
| 1055076 | * 1/1967 | (GB) | 376/416 |
| 1225970 | * 3/1971 | (GB) | 376/416 |
| 45-30638 | * 3/1970 | (JP) | 376/428 |
| 1065186 | * 4/1986 | (JP) | 376/416 |
| 5180971 | * 7/1993 | (JP) | 376/170 |
| 6265669 | * 9/1994 | (JP) | 376/414 |
| 97/09721 | 3/1997 | (WO) . | |

OTHER PUBLICATIONS

Patent Abstracts of Japan, vol. 14, No. 554 (P–1140), Dec. 10, 1990 & JP 02 236197 A (Kobe Steel LTD), Sep. 19, 1990.

Nuclear Engineering International, vol. 23, No. 266, pp 40–43, McKay, Jan. 1978.*

Nuclear Science and Engineering, vol. 103, pp 150–156, Wootan et al, 1989.*

*Primary Examiner*—Harvey E. Behrend
(74) *Attorney, Agent, or Firm*—Wenderoth, Lind & Ponack, L.L.P.

(57) ABSTRACT

A new transmutation assembly permits an efficient transmutation of a long-lived radioactive material (long-lived FP nuclides such as technetium-99 or iodine-129) which was produced in the nuclear reactor. Wire-type members of a long-lived radioactive material comprised of metals, alloys or compounds including long-lived FP nuclides are surrounded by a moderator material and installed in cladding tubes to form FP pins. The FP pins, and nothing else, are housed in a wrapper tube to form a transmutation assembly. The wire-type members can be replaced by thin ring-type members. The transmutation assemblies can be selectively and at least partly loaded into a core region, a blanket region or a shield region of a reactor core in a fast reactor. From a viewpoint of reducing the influence on the reactor core characteristics, it is optimal to load the transmutation assemblies into the blanket region.

4 Claims, 4 Drawing Sheets

U.S. PATENT DOCUMENTS

| | | | | |
|---|---|---|---|---|
| 3,230,151 | * | 1/1966 | Mills et al. | 376/428 |
| 3,244,599 | * | 4/1966 | Hildebrand | 376/424 |
| 3,252,868 | * | 5/1966 | Perilhou et al. | 376/425 |
| 3,275,525 | * | 9/1966 | Bloomster et al. | 376/428 |
| 3,291,696 | * | 12/1966 | Sugimoto et al. | 376/428 |
| 3,291,699 | * | 12/1966 | Trickett et al. | 376/416 |
| 3,318,779 | * | 5/1967 | Turner et al. | 376/423 |
| 3,342,692 | * | 9/1967 | Bourrasse et al. | 376/421 |
| 3,350,274 | * | 10/1967 | Higatsberger | 376/423 |
| 3,387,148 | * | 6/1968 | Janner et al. | 376/423 |
| 3,407,116 | * | 10/1968 | Clough | 376/425 |
| 3,409,503 | * | 11/1968 | Swanson | 376/172 |
| 3,409,504 | * | 11/1968 | Bailly et al. | 376/416 |
| 3,431,169 | * | 3/1969 | Ellington | 376/425 |
| 3,620,835 | * | 11/1971 | Drittler et al. | 376/417 |
| 3,658,644 | * | 4/1972 | Long | 376/202 |
| 3,891,502 | * | 6/1975 | Hackstein et al. | 376/172 |
| 5,225,154 | * | 7/1993 | Kanno et al. | 376/416 |
| 5,446,773 | * | 8/1995 | Wakabayashi | 376/170 |
| 5,805,655 | * | 9/1998 | Chan | 376/417 |
| 5,887,044 | * | 3/1999 | Crawford et al. | 376/416 |

* cited by examiner

FIG. 2
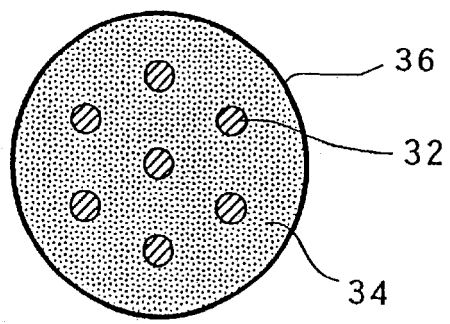
FIG. 3A    FIG. 3B
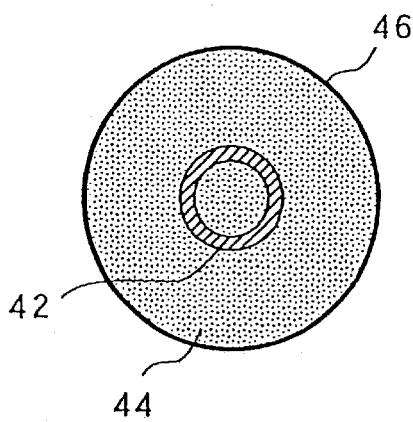 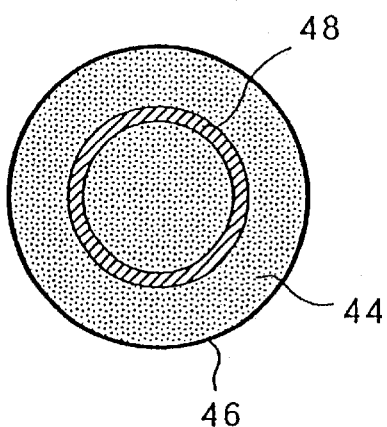
FIG. 3C
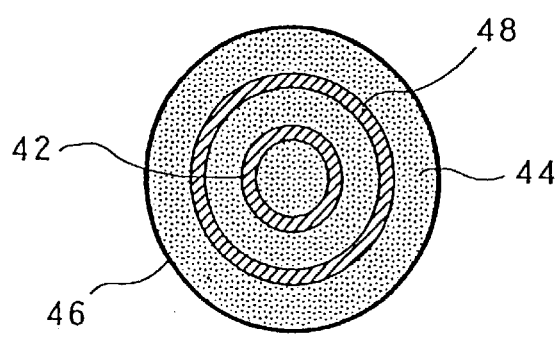

◯ INNER CORE

⊕ OUTER CORE

▨ RADIAL BLANKET (Subassembly for FP Transmutation)

⬡ SHIELD

⊙ PRIMARY CONTROL ROD

◎ BACK-UP CONTROL ROD

| REACTOR CORE | BLANKET |

ASSEMBLY FOR TRANSMUTATION OF A LONG-LIVED RADIOACTIVE MATERIAL

BACKGROUND OF THE INVENTION

1. The Field of the Invention

The present invention relates in general to an assembly which is loaded into a fast reactor for the purposes of transmutation treatment of a long-lived radioactive material. More particularly, the present invention relates to an assembly for transmutation of a long-lived radioactive material, in which the transmutation assembly is composed solely of FP (fission product)—containing pins, in which each of the FP pins has a cladding tube containing therein a moderator and a radioactive material including long-lived fission product (LLFP) nuclides in such a manner that the radioactive material is surrounded by, or in other words covered with, the moderator material in the cladding tube.

2. Description of Prior Art

Utilization of nuclear energy is inevitably followed by the generation, more or less, of long-lived fission products (LLFP). High level radioactive waste which has been disposed of by glassification generally contains long-lived radioactive FP nuclides, such as technetium-99 and iodine-129, which have a half-lives of about 210 thousand years and about 1.6 million years, respectively. Technetium-99 is water-soluble and there is fear that it is, after a long period of time, eluted and released out of a barrier in the form of ions of $TcO_4^-$, etc. following geologic disposal. With respect to iodine-99, considering its safety from the viewpoint of migration into the ground water when the iodine-99 is solidified and then subject to geologic disposal, there are the problems that this material has a high solubility and has a low absorption by the barrier. Thus, from a viewpoint of reduction of the environmental load, these long-lived FP nuclides should preferably be transformed into the other stable nuclides by a suitable method before a final disposal thereof. For example, the technetium-99 and iodine-129 are transformable, by a neutron absorption reaction, into non-radioactive and stable ruthenium (Ru) and xenon (Xe).

Technetium-99 and iodine-129, which are long-lived FP nuclides, have larger neutron absorption cross sections for thermal neutron energy than for fast neutron energy, and have larger resonance absorption regions in a lower energy region (approximately 5 eV, etc.). Therefore, in order to transmutate these long-lived FP nuclides by neutron absorption reactions, it is advisable to slow down to some extent fast neutrons which have been generated by nuclear fission, and then use the same as resonance energy neutrons or thermal neutrons.

Both thermal neutron reactors and fast neutron reactors are considered as reactors in which to transmute long-lived FP nuclides. A thermal neutron reactor utilizes moderated or slowed-down neutrons and, therefore, the nuclides can be transmuted, to some extent, by loading pins which contain technetium-99 or iodine-129 into the reactor core. A fast neutron reactor, on the other hand, requires the fast neutrons to be moderated and, therefore, has utilized an assembly having a structure in which long-lived FP nuclides-containing pins and moderator-containing pins are housed together in a wrapper tube, for the purpose of transmutation of these long-lived FP nuclides.

A conventional assembly for the purpose of transmutation is shown in FIG. 6, in which moderator-containing pins 12 and FP-containing pins 14 are disposed in a dispersed arrangement in a wrapper tube 10 as illustrated. The moderator pin 12 is composed of a cladding tube which contains moderator material and nothing else, and the FP pin 14 is composed of a cladding tube which contains the material including long-lived FP nuclides, and nothing else.

In the case where the assemblies for the transmutation purposes as described above are loaded into a blanket region of the fast reactor, the transmutation rate of the long-lived FP nuclides is approximately 2.0–2.5% which is not as much as the requirement. The inventor of the present invention considers that the reason for such a low transmutation rate resides in a remarkably high self-shielding effect of the neutrons in the FP pins such that the nuclear reactions between the FP and the neutrons are carried out only near the surface of the FP pins, with the result that the neutrons are prevented from entering deep into the FP pins. This problem would be solved to a limited extent by an attempt at forming thinner FP pins but this measure would raise other serious problems in that the necessary number of pins is increased, resulting in deficiencies in production, working effect and cost performance.

Further, in the conventional structure of the transmutation-purpose assemblies as described above, the arrangement of the FP pins and the moderator pins in the space of the assembly is complex, resulting in less working efficiency and difficulties in inspection of the pins.

SUMMARY OF THE INVENTION

Accordingly, the present invention is proposed to solve the above problem, and it is therefore an object of the present invention to provide an improved assembly for transmutation which permits an efficient transmutation (i.e., transformation into stable nuclides by a nuclear transformation), in a nuclear reactor, of a long-lived radioactive material (especially, long-lived FP nuclides such as technetium-99 or iodine-129, etc.) which was produced in a nuclear reactor.

Another object of the invention is to provide an assembly for transmutation of a long-lived radioactive material which permits a high workability of production and a high operability of inspection and also meets with a requirement for reduction of costs.

In a first aspect of the present invention, there is provided an assembly for transmutation of a long-lived radioactive material comprising:

wire-type members of a long-lived radioactive material comprised of metals, alloys or compounds including long-lived fission product nuclides, a moderator material surrounding the wire-type members, cladding tubes each containing therein the wire-type members surrounded by the modulator material to thereby form FP (fission products) pins, and a wrapper tube housing therein the FP pins and nothing else.

In the transmutation assembly described above, the wire-type members of the long-lived radioactive material may be located in a dispersed state and each of the dispersed wire-type members is surrounded by the moderator material.

In a second aspect of the invention, there is provided an assembly for transmutation for a long-lived radioactive material comprising:

thin ring-type (or tubular) members of a long-lived radioactive material comprised of metals, alloys or compounds including long-lived fission product nuclides, a moderator material surrounding an inner surface and an outer surface of the thin ring-type members, cladding tubes each containing therein the thin ring-type members surrounded by the moderator material to thereby form FP pins, and a wrapper tube housing therein the FP pins and nothing else.

In a third aspect of the invention, there is provided a reactor core for a fast reactor comprising a core region, a blanket region and a shield region, wherein transmutation assemblies are selectively and at least partly loaded into the core region, the blank region or the shield region, each of said transmutation assemblies comprising:

wire-type members of a long-lived radioactive material comprised of metals, alloys or compounds including long-lived fission product nuclides, a moderator material surrounding the wire-type members, cladding tubes each containing therein the wire-type members surrounded by the moderator material to thereby form FP pins, and a wrapper tube housing therein the FP pins solely.

In a fourth aspect of the invention, there is provided a reactor core for a fast reactor comprising a core region, a blanket region and a shield region, wherein transmutation assemblies are selectively and at least partly loaded into the core region, the blanket region or the shield region, each of said transmutation assemblies comprising:

thin ring-type members of a long-lived radioactive material comprised of metals, alloys or compounds including long-lived fission product nuclides, a moderator material surrounding an inner surface and an outer surface of the thin ring-type members, cladding tubes each containing therein the thin ring-type members surrounded by the moderator material to thereby form FP pins, and a wrapper tube housing therein the FP pins solely.

In the present invention, wire-type members of a long-lived radioactive material are surrounded by a moderator material and then the wire-type members surrounded by the moderator material are installed in cladding tubes to form FP pins and the FP pins, and nothing else, are housed in a wrapper tube. The long-lived radioactive material is comprised of metals, alloys or compounds including long-lived fission product nuclides. The wire-type members described above can be placed in a dispersion arrangement with the enclosure by the moderator material.

In another embodiment of the invention, the wire-type members described above can be replaced by a single or a plurality of ring-type or thin-walled tubular member(s), and the thin ring-type member(s) is or are surrounded by the moderator material on the outer and inner surfaces thereof and then placed into the cladding tubes to thereby form the FP pins. Only the FP pins are housed in the wrapper tube.

In order to carry out a transmutation treatment, the transmutation assemblies of the long-lived radioactive material as described above can be loaded selectively and at least partly into a core region, a blanket region or a shield region of a reactor core of a fast reactor. From a viewpoint of reducing possible influence on the reactor core characteristics, it is optimal to load the transmutation assemblies into the blanket region in the reactor core.

BRIEF DESCRIPTION OF THE DRAWINGS

FIG. 2 is a sectional view of a FP pin according to another embodiment of the invention which is loadable into the transmutation assembly.

FIGS. 3A, 3B and 3C are sectional views of pins according to further embodiments of the invention in which one or a plurality of thin ring-type members of a long-lived radioactive material are disposed.

PREFERRED EMBODIMENTS OF THE INVENTION

Figure 1:
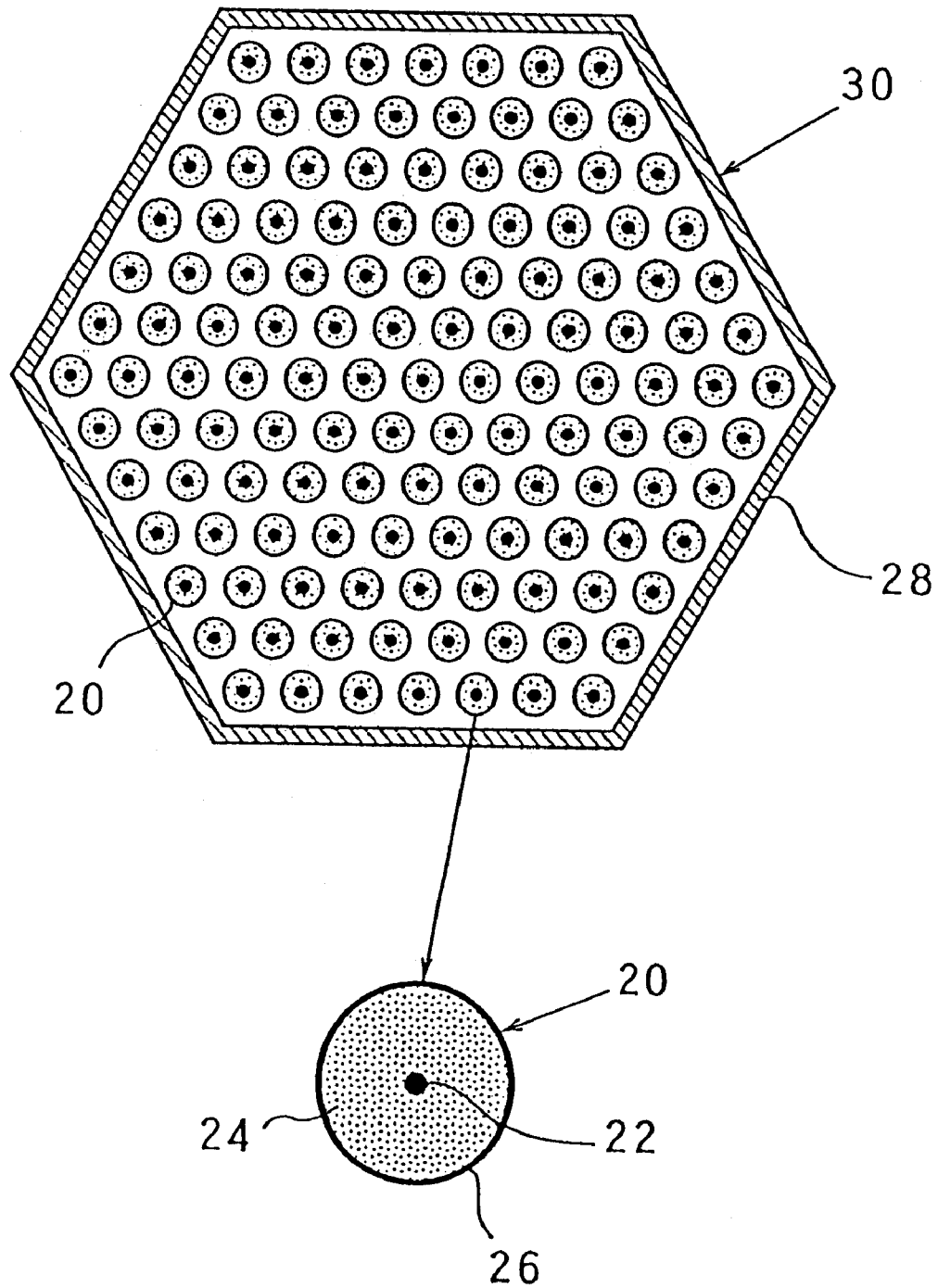
FIG. 1 is a transverse sectional view of a transmutation assembly of a long-lived radioactive material and a FP pin loaded into the assembly in an embodiment of the present invention.

FIG. 1 is a transverse sectional view of an assembly for transmutation (ie., transmutation assembly) of a long-lived radioactive material according to an embodiment of the present invention and an example of a FP pin loaded into the transmutation assembly. The FP pin 20 has a structure in which a single wire-type member 22 of the long-lived radioactive material composed of metals, alloys or compounds including long-lived fission product (LLFP) nuclides is disposed at a center of the FP pin and the wire-type member 22 is surrounded by a moderator material 24 to form a pellet-like or rod-like structure and loaded in a cladding tube 26. A plurality of such FP pins 20 are prepared and arranged in a bundle-like structure and located in a hexagonal wrapper tube 28 to thereby form the transmutation assembly 30 of the long-lived radioactive material of the present invention.

The long-lived fission product (LLFP) nuclides include, for example, technetium-99 and iodine-129 and are used in the form of a metal, an alloy or a compound. In the case of technetium, for example, Tc (metal), $TcO_2$ and so forth are used. In the case of iodine, AgI, NaI, $PdI_2$, $CeI_3$ and so forth can be used. The wire-type member 22 of the long-lived radioactive material is preferably formed such that it has a diameter of about 1 to 2 mm. This will permit moderator to slow down neutrons in a suitable manner and restrict as much as possible the self-shielding effect of the neutrons (that is, the effect of preventing the neutrons entering deep into the FP) so that a high transmutation rate can be achieved. The wire-type member 22 having a diameter of 1 mm or more can be produced relatively easily. As the moderator material 24, zirconium hydride or beryllium oxide, for example, can be used.

The pellet or rod, which is formed by surrounding the wire-type member 22 of the long-lived radioactive material by means of the moderator material 24 as described above, is inserted into the cladding tube 26 along a substantially entire length thereof and sealed at its upper and lower ends by end plugs (not shown) in a manner similar to the case of general fuel pins. The wrapper tube 28 in which a plurality of FP pins 20, and nothing else, are located in a regular arrangement has a similar structure to that of a general fuel assembly and has an entrance nozzle (not shown) at its lower portion and a handling head (not shown) at an upper portion for facilitating the loading work by the use of a fuel loading/unloading machine so that a coolant can flow inside the wrapper tube 28.

FIG. 2 shows another embodiment of the FP pin. In this embodiment, a plurality of wire-type members (seven wire-type members in the illustrated embodiment) 32 are disposed in a dispersed arrangement and each of the wire-type members 32 is surrounded by a moderator material 34 to form a pellet or rod structure, and loaded into a cladding tube 36. Installation of a plurality of wire-type members 32 of the long-lived radioactive material can increase the amount of transmutation. Similar to the case of the previous embodiment, it is desirable that the diameter of the wire-type member 32 of the long-lived radioactive material is selected from a range from about 1 mm to 2 mm. It is appreciated that the number of the wire-type members 32 and the location thereof are optional and can be selected as desired in accordance with requirements.

FIG. 3A, FIG. 3B and FIG. 3C show further embodiments of the FP pin, in which a thin ring-type or thin-wall tubular member 42 of a long-lived radioactive material is used.

In the embodiment of FIG. 3A, a thin ring-type member 42 of the long-lived radioactive material has a relatively small diameter and is positioned at the center of the pin so that the thin ring-type member 42 is surrounded at both its inner and outer surfaces by a moderator material to form a pellet-like or rod-like structure and loaded into the cladding tube 46.

In the embodiment of FIG. 3B, a thin ring-type member 48 of the long-lived radioactive material having a relatively large diameter is provided so that the thin ring-type member 48 is surrounded at it both inner and outer surfaces by the moderator material 44 to form a pellet-like or rod-like structure and then loaded into the cladding tube 46.

In the embodiment of FIG. 3C, the above-described thin ring-type member 42 of a small diameter and the thin ring-type member 48 of a large diameter are concentrically located and surrounded at their inner and outer surfaces by the moderator material 44 to form a pellet-like or rod-like structure, and loaded into the cladding tube 46. This structure having a plurality of thin ring-type members 42 and 48 of the long-lived radioactive material can increase its transmutation performance.

In the embodiments of FIGS. 3A, 3B and 3C, it is desirable that each of the thin ring-type members 42, 48 has a thickness of about 1 to 2 mm. The FP pins shown in FIGS. 3A, 3B and 3C are suitable for decreasing or lowering the self-shielding effect of neutrons and increasing the transmutation rate. The thin ring-type members each having a thickness of 1 mm or more can be produced relatively easily.

The transmutation assembly of a long-lived radioactive material can be formed by using one of the types of those FP pins described above and, therefore, production and inspection of the transmutation assembly can be performed quite simply, with the result of a reduction in costs.

The transmutation assemblies of the present invention can be loaded selectively and partly into a core region, a blanket region or a shield region of a reactor core in a fast reactor. When the transmutation assemblies are loaded into the blanket region, all of the blanket assemblies may be replaced by the transmutation assemblies. In order to effectively use the excess of neutrons and restrict an influence upon the reactor core characteristics, it is optimal that the transmutation assemblies are loaded in the blanket region.

EXAMPLE

An experiment was made with reference to a fast reactor which has transmutation assemblies of a long-lived radioactive material loaded in the blanket region and detailed analysis was made by using a Monte Carlo Code. Table 1 below shows the results. The transmutation assembly which is the scope of the present invention (Invention 1 and Invention 2, below) had a structure as shown by FIG. 1, in which long-lived technetium-99 was formed into a thin metal wire and surrounded by a moderator material of zirconium hydride to form pellets, and then the pellets were loaded into a cladding tube to form a FP pin. A plurality of FP pins surrounded by a wrapper tube form a transmutation assembly. The transmutation assemblies were loaded into a blanket region of a fast reactor of 1 million kWe as shown in FIGS. 4 and 5 and a one-year term transmutation rate was obtained.

Figure 4:
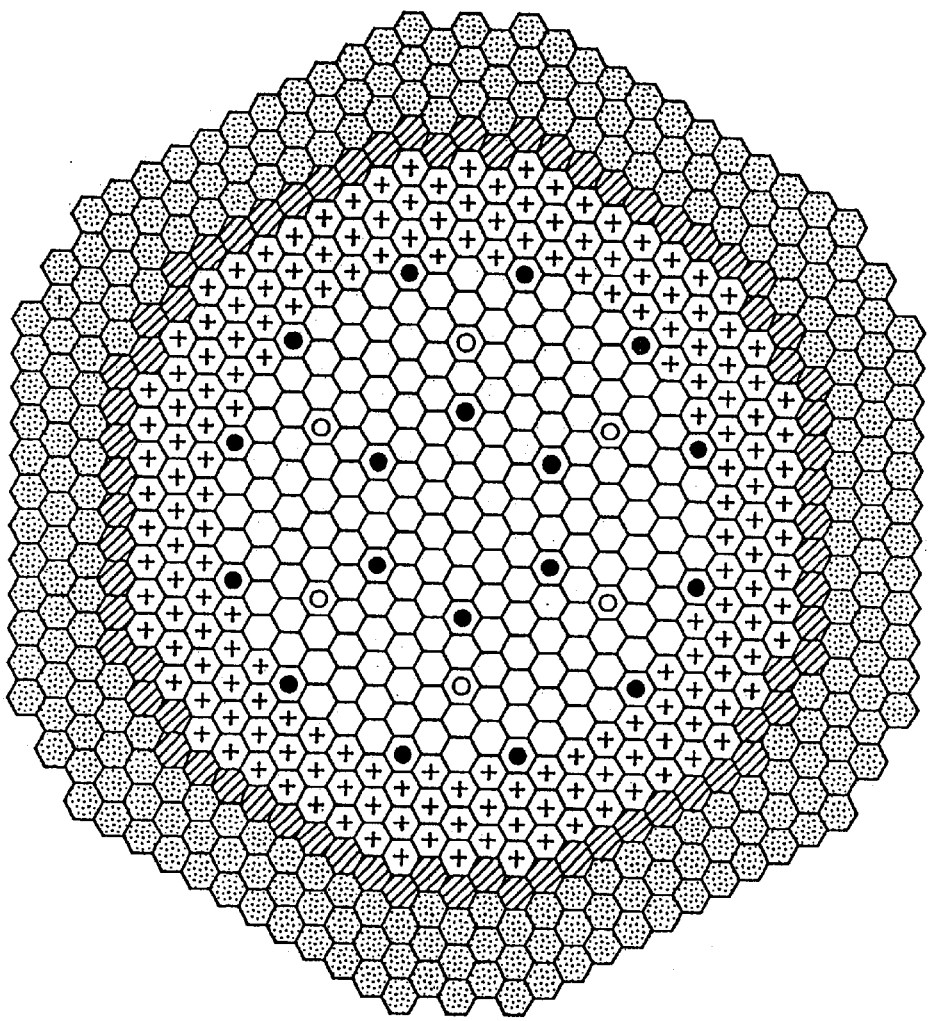
FIG. 4 is a diagram of an example of a reactor core of a fast reactor into which the transmutation assembly is loaded.
Figure 5:
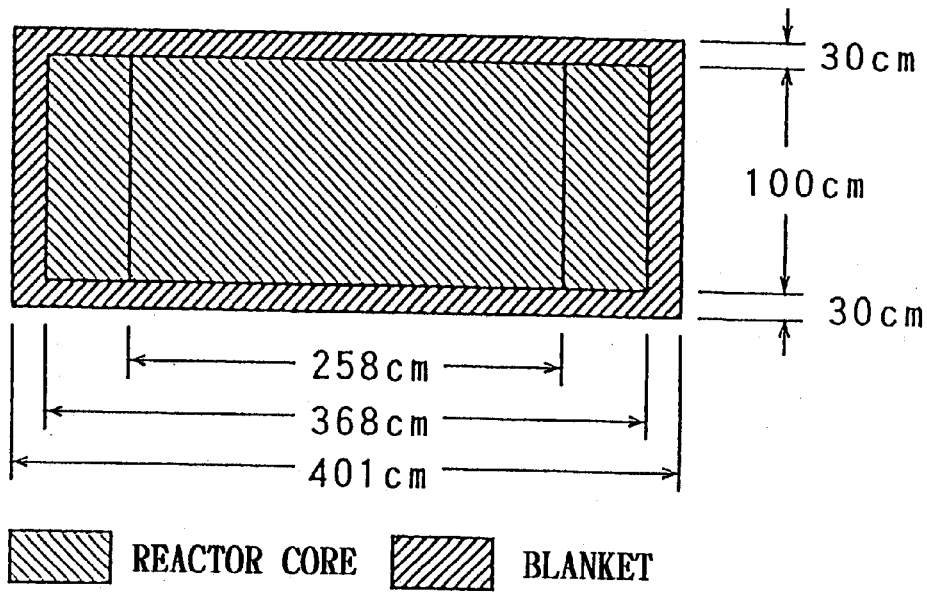
FIG. 5 is a diagram, in a longitudinal section, of the reactor core shown in FIG. 4.
Figure 6:
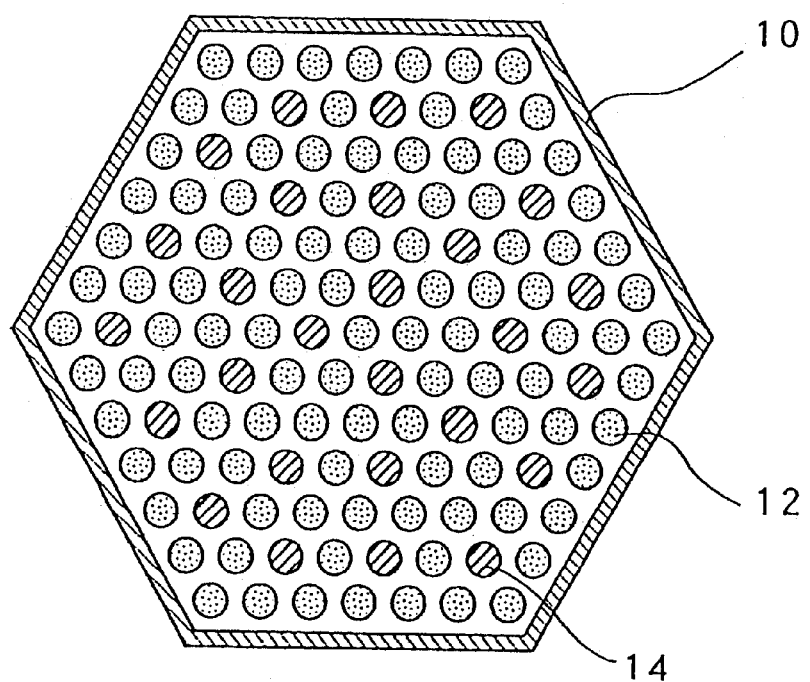
FIG. 6 is a transversal sectional view of an example of the conventional transmutation assembly for a long-lived radioactive material.

FIG. 4 shows the core structure of the fast reactor and the loading position of the transmutation assemblies and FIG. 5 shows the dimensions of the reactor core. In this structure, it is seen that the transmutation assemblies are loaded in the position of a radial blanket. For comparison purposes, analysis was made for the conventional transmutation assembly of a long-lived radioactive material shown in FIG. 6, as shown by "Conventional Example (Conv. Ex.)1" and "Conventional Example (Conv. Ex. 2)" in Table 1 below.

TABLE 1

| Loading method of FP pins | No. of pins in assembly | No. of FP pins | Diameter of FP pins (mm) | Loaded amount (kg) | Transmuted amount (kg/year) | Transmutation rate (%/year) |
| --- | --- | --- | --- | --- | --- | --- |
| Conv. Ex. 1 | 127 | 37 | 10 | 3750 | 67.5 | 1.8 |
| Conv. Ex. 2 | 127 | 22 | 10 | 1883 | 45.8 | 2.5 |
| Invention 1 | 127 | 127 | 1.3 | 183 | 17.9 | 9.8 |
| Invention 2 | 217 | 217 | 1.3 | 313 | 28.5 | 9.1 |

In Table 1, the "No. of FP pins" of the conventional examples (Conv. Ex. 1 and Conv. Ex. 2) represent the FP pins into which only a long-lived radioactive material is loaded and the "No. of FP pins" of the present invention ("Invention 1" and "Invention 2") represent the FP pins loaded with pellets which are composed of wire-type long-lived radioactive material surrounded by the moderator material. Accordingly, the radius of the conventional FP material is coincident with the pin radius, and the radius of FP material of the invention is equal to the radius of the wire type material and the radius of the actual pins (FP pins) is 5 mm, which is the same as that of the conventional ones.

As shown by Table 1, the transmutation rate is low (that is, 1.8 to 2.5 %/year) in the case where the conventional transmutation assembly is used and is therefore not so effective. By contrast, use of the transmutation assembly for long-lived radioactive material of the present invention successfully achieved a high transmutation rate of about 9 to 10%/year, which is 4–5 times as high as the conventional structure, regardless of the number of pins used in the assembly.

From the analysis, the number of pins in the transmutation assembly in the present invention can be extended to about 127–271 as shown in Table 1. In the example, the wire-type long-lived radioactive material had a diameter of 1.3 mm but any wire-type long-lived material can be used if it has a diameter in a range between about 1 mm and about 2 mm.

According to the present invention, the transmutation assembly is composed solely of FP-containing pins each of which is formed of a cladding tube and wire-type or thin ring-type members of a long-lived radioactive material surrounded by a moderator material; this allows the transmutation rate of the long-lived FP nuclides to achieve an extraordinarily high level. Further, the transmutation assembly can be formed with FP pins of the same type, with a consequent simplification of production and inspection and reduction of costs.

What is claimed is:

1. An assembly for transmutation of a long-lived fission product material, produced by a nuclear reactor, into stable nuclides, said assembly comprising:

a plurality of fission product pins, each consisting of:
a member having a diameter of approximately 1 mm to 2 mm and consisting of a long-lived fission product material that was produced in a nuclear reactor, said fission product material being in the form of a metal, alloy, or compound,
a moderator surrounding said member, and
a cladding tube, containing said member and said moderator; and a wrapper tube housing only said fission product pins.

2. An assembly for transmutation of a long-lived fission product material, produced by a nuclear reactor, into stable nuclides, said assembly comprising:

a plurality of fission product pins, each consisting of:
a plurality of members each having a diameter of approximately 1 mm to 2 mm and consisting of a long-lived fission product material that was produced in a nuclear reactor, said fission product material being in the form of a metal, alloy, or compound,
a moderator surrounding said members, and
a cladding tube, containing said members and said moderator; and a wrapper tube housing only said fission product pins.

3. An assembly according to claim 2, wherein said plurality of members are separated from each other and are substantially parallel to each other.

4. A reactor core for a fast reactor, said reactor core comprising a core region, a blanket region, a shield region, and a plurality of transmutation assemblies selectively and at least partly loaded into the core region, the blanket region or the shield region, each of said transmutation assemblies comprising:

a plurality of fission product pins, each consisting of:
a member having a diameter of approximately 1 mm to 2 mm and consisting of a long-lived fission product material that was produced in a nuclear reactor, said fission product material being in the form of a metal, alloy, or compound,
a moderator surrounding said member, and
a cladding tube, containing said member and said moderator; and a wrapper tube housing only said fission product pins.

* * * * *